United States Patent
Bhatt et al.

(10) Patent No.: US 9,958,852 B2
(45) Date of Patent: May 1, 2018

(54) MULTI-MOVER LINEAR MOTOR CONTROLLER PROVIDING SHARED COORDINATION SUBSYSTEM

(71) Applicant: Rockwell Automation Technologies, Inc., Mayfield, OH (US)

(72) Inventors: Jatin Bhatt, Highland Heights, OH (US); Bohumir Sladek, Sestajovice (CZ); Bhanu Gouda, Reminderville, OH (US); Jesse Dunham, Willoughby Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 299 days.

(21) Appl. No.: 15/005,171

(22) Filed: Jan. 25, 2016

(65) Prior Publication Data
US 2017/0212494 A1 Jul. 27, 2017

(51) Int. Cl.
*G05B 19/19* (2006.01)

(52) U.S. Cl.
CPC .... *G05B 19/19* (2013.01); *G05B 2219/34206* (2013.01); *G05B 2219/41327* (2013.01)

(58) Field of Classification Search
CPC ...................................................... G05B 19/19
USPC .......................................................... 318/3, 34
See application file for complete search history.

(56) References Cited

U.S. PATENT DOCUMENTS

| 4,714,400 | A | * | 12/1987 | Barnett ............... G05B 19/232 318/38 |
|---|---|---|---|---|
| 6,975,081 | B1 | | 12/2005 | Faizullabhoy et al. |
| 7,026,732 | B1 | | 4/2006 | Backman et al. |
| 2013/0119897 | A1 | | 5/2013 | Wernersbach et al. |

OTHER PUBLICATIONS

EP Search Report: Application No. 17151765.9 dated Jul. 31, 2017.

* cited by examiner

*Primary Examiner* — David S Luo
(74) *Attorney, Agent, or Firm* — Boyle Fredrickson, SC

(57) ABSTRACT

A runtime coordination subsystem allows programmers of multi-mover, linear motion systems to provide simple commands to the movers without concern for the presence of other movers on the track. The runtime coordination subsystem manages proper separation distances to prevent collisions and automatically queue movers in contention situations. In addition the runtime coordination subsystem permits a specialized multi-mover command controlling movers in unison with constant separation.

16 Claims, 6 Drawing Sheets

MULTI-MOVER LINEAR MOTOR CONTROLLER PROVIDING SHARED COORDINATION SUBSYSTEM

BACKGROUND OF THE INVENTION

The present invention relates to linear motors with multiple movers and in particular to a control system that provides a shared coordination subsystem greatly simplifying the programming and configuration of movers on the linear motor.

Linear motors take the principles of a standard rotary motor, for example, a synchronous permanent magnet motor, and adapt that for linear motion by effectively "unrolling" the rotor and stator. One type of linear motor provides a track having a set of individually energizable track coils separated along the length of the track. A mover is mechanically attached to move along the track and may include permanent magnets that interact with the coils that propel the mover allowing the mover to be moved and positioned at various locations on the track. By sequencing the coils, the mover may be passed from coil to coil along the track. By controlling the relative current flowing in coils adjacent to a mover, substantially continuous positioning of the mover between those coils may be obtained.

Despite the term "linear", linear motors may include tracks that are not necessarily straight but that can curve, for example, in a loop, positioning the mover at various locations in the loop.

The interaction between the coils of the track and the mover is local so only coils adjacent to the magnets of the mover need be energized to control that mover. Accordingly it is possible to put multiple movers on a track and to control each mover independently.

A multi-mover, linear motor system can be advantageously applied to a number of industrial control problems, for example, moving a product of manufacture between various manufacturing stations. In this application, and unlike a conventional conveyor belt, the movers need not move in unison but can separate apart or bunch together as necessary, for example, forming small queues along the track to accommodate different processing speeds at various stations. A benefit of this capability is that it can greatly reduce the space between manufacturing stations and thus the size of the interconnected manufacturing system.

The ability to move a particular product on a mover without moving other products on a common track also allows higher-speed repositioning of product, allows the mover to participate in the processing of the product at each station, and allows cooperative participation by the movers in the manufacturing process by positioning different portions of a product on one mover with respect to other portions on a second mover.

Programming a multi-mover, linear motor system can be difficult. The movers can operate in close proximity requiring the programmer when repositioning a given mover to consider the positions of other movers with which it might collide. The conditions for collision can change significantly depending on the motion and inertial load of the various movers. Synchronizing motion of the movers can be extremely difficult resulting in a "caterpillar" effect wherein movers that should move simultaneously, begin and end their movements at different times, separating apart at the beginning of the move and then bunching up later in the move because of lags in the detection of the information from their immediate predecessor, much like a caterpillar stretching and contracting when it moves.

The challenge of programming a multi-mover, linear motor is exacerbated when they are used in an industrial control environment where control programs are constantly changing in response to new manufacturing problems and evolution of the manufacturing process.

SUMMARY OF THE INVENTION

The present invention greatly simplifies programming of multi-mover, linear motor systems by allowing the programmer to program the motion of each mover as if it were operating in isolation. A shared coordination subsystem, configured with information describing the overall physics of the linear motor system, converts the position commands developed by the programmer into coordinated position commands that respect the interaction of the movers and in particular that manages collision avoidance without further programming effort by the programmer. For example, a program that positions multiple movers at an identical location will produce coordinated position commands that neatly queue the movers at a predetermined separation distance waiting their turn. Coordinated motion in which movers move in unison is also greatly simplified.

Specifically then, in one embodiment, the invention provides a control system for a multi-mover, linear motor system providing multiple movers movable along a path on a track. Each mover may provide magnetic pole elements interacting with electrical coils distributed along the track for movement of the mover along the track as the electrical coils are activated in response to track signals. The control system includes I/O circuits adapted to communicate with the track to provide track signals to the track and a controller circuit communicating with the I/O circuits. The control system operates to: (a) receive and execute an industrial control program generating command movement signals for at least two movers on a track describing a desired position of each mover on the track; (b) execute a coordination subsystem separate from the received industrial control programs converting the desired position of at least one mover on the track to coordinated position signals which change the command movement signals according to current relative positions of at least one other mover; and (c) communicate the coordinated movement signals to the I/O circuits for outputting as track control signals.

It is thus a feature of at least one embodiment of the invention to greatly reduce the complexity of using a multi-mover, linear motor system to programmers who must develop program solutions in the dynamic environment of industrial control. It is another feature of at least one embodiment of the invention to largely eliminate the complexity of coordinating mover programs in industrial control programs that may be segregated for development by different programmers.

The coordination subsystem may include a data structure for each given mover indicating a leader for that given mover being an adjacent mover in a direction of movement of the given mover and wherein the coordinated movement signal for each given mover is a function of movement of a leader for that given mover.

It is thus a feature of at least one embodiment of the invention to provide a simple paradigm for collision avoidance in which a leader mover is identified and used to define parameters needed for collision avoidance and coordination.

The control system wherein the coordination subsystem changes a leader for a given mover when a direction of the mover changes. In cases when the track provides a branch segment operating to allow a given mover to move between a first and second track at a branch, the coordination subsystem can change a leader value for the given mover as it moves from the first to the second track.

It is thus a feature of at least one embodiment of the invention to adapt the leader paradigm to situations where motion direction can change or the topology of the track can be altered.

The coordination subsystem data structure may further include a minimum collision avoidance distance for each given mover and the coordination subsystem may modify a command movement signal falling within an offset equal to the minimum collision avoidance distance from a position of the leader by changing the command movement signal to a coordinated movement signal equal to the position of the leader offset by the minimum collision avoidance distance.

It is thus a feature of at least one embodiment of the invention to allow automatic enforcement of a safe operating separation between movers invisibly to the industrial control program programmer.

The coordination subsystem data structure may further include an inertia value for each given mover and the coordination subsystem may determine a protection zone as a function of the inertia value to modify a command movement signal falling within a protection zone to follow a trajectory allowing the mover to stop at the minimum collision avoidance distance.

It is thus a feature of at least one embodiment of the invention to provide load-aware, automatic deceleration and acceleration preserving the minimum collision avoidance distance.

The size of the protection zone may also be a function of the inertia ratio of the leader.

It is thus a feature of at least one embodiment of the invention to take advantage of relaxed deceleration requirements when the leader mover is also decelerating.

The industrial control program may include a cluster movement command describing a unison movement of multiple movers and the coordination subsystem may divide the cluster command into separate command movement signals for each mover of the multiple movers separated by a predetermined minimum collision avoidance distance.

It is thus a feature of at least one embodiment of the invention to provide simple programming of unison motion of the movers when such motion is desired.

The coordination subsystem may provide a modified protection zone for follower objects within the cluster, the protection zone describing a distance at which the mover must decelerate to stop at the minimum collision avoidance distance, by reducing the protection zone.

It is thus a feature of at least one embodiment of the invention to eliminate "caterpillaring" in a cluster where it can be assumed that each mover is receiving identical commands and hence collision is naturally avoided.

The coordination subsystem may convert the command movement signals to coordinate movement signals by limiting the maximum velocity and acceleration of the multiple movers to the lowest maximum acceleration velocity of any one of the movers of the multiple movers.

It is thus a feature of at least one embodiment of the invention to ensure that movers in a cluster are operating within identical acceleration envelopes to prevent caterpillaring caused by unequal loads on the movers.

The industrial control program may include a separation command describing a desired separation between the movers of the multiple movers and the coordination subsystem may convert the command movement signals to coordinate movement signals by increasing the predetermined minimum collision avoidance distance by the difference between the desired separation and the minimum collision avoidance distance.

It is thus a feature of at least one embodiment of the invention to provide a simple command for changing the separation between clustered movers without the need for complex calculations of dynamic position offsets.

The electrical coils of the track may be arranged in segments associated with motor drive circuitry and the coordination subsystem may receive information associating different segments with different I/O circuits and may direct the coordinated movement signals to an I/O circuit based on a mapping of the coordinated movement to a segment having coils proximate to a track location of the coordinated movement signals.

It is thus a feature of at least one embodiment of the invention to eliminate the need for a separate track appliance for tracking movers and routing coil control signals appropriately.

The controller circuit may include at least one processor executing a first stored program to execute the industrial control program and a second stored program to execute the coordination subsystem.

It is thus a feature of at least one embodiment of the invention to permit the coordination subsystem to be executed at least in part by existing controller hardware.

These particular objects and advantages may apply to only some embodiments falling within the claims and thus do not define the scope of the invention.

DETAILED DESCRIPTION OF THE PREFERRED EMBODIMENT

Figure 1:
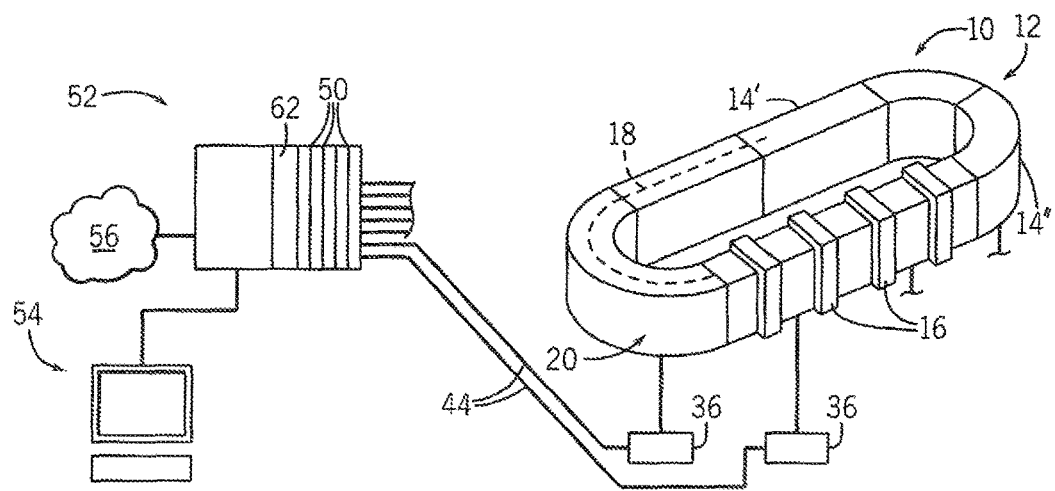
FIG. 1 is a simplified perspective view of a multi-mover, linear motor system providing a multi-segment track and multiple movers on that track together with a controller suitable for use with the present invention.

Referring now to FIG. 1, a multi-mover, linear motor system 10 may include a linear motor track 12 typically assembled from track segments 14, including, for example, straight segments 14' and arcuate segments 14" such as may be interconnected to provide, in this example, a continuous oval track having two opposed straight sides and two perpendicularly opposed hemicircular ends.

The linear motor track 12 may support multiple movers 16, the latter of which are mounted to slide along the track 12 between unique positions along a track axis 18 generally following the shape of the track 12, in this case, an oval. Each position along the track axis 18 may be identified to a unique position number, for example, a consecutive integer. A track system suitable for this purpose is manufactured by Rockwell Automation under the tradename iTrak® which provides repeatable positioning to less than 35 micrometers at speeds of up to seven meters per second and 10 g of acceleration.

Figure 2:
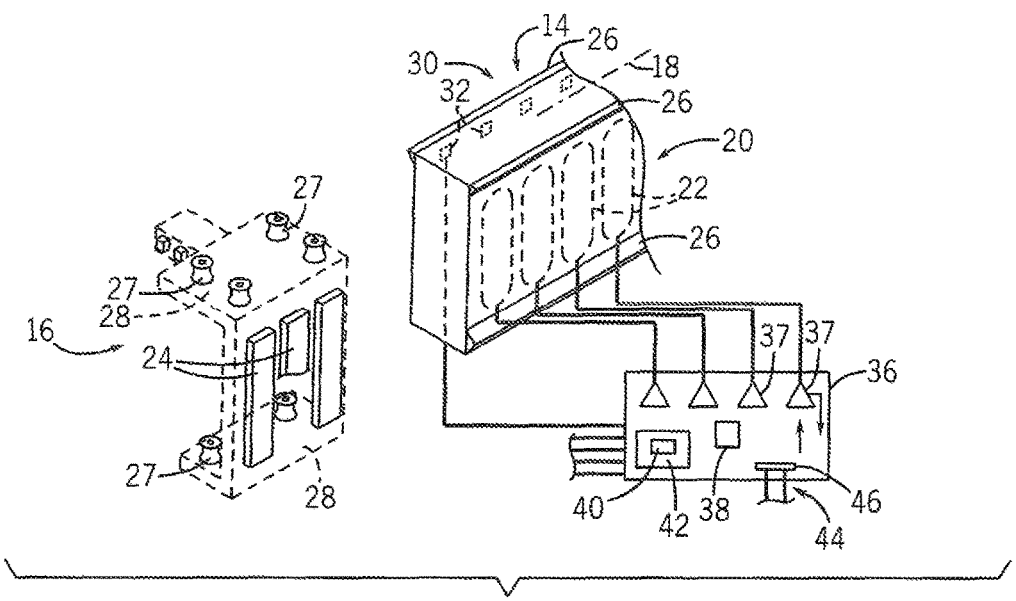
FIG. 2 is an exploded, fragmentary detail of the track of FIG. 1 showing connection of track coils for a track segment as connected to a dedicated driver.

Referring also to FIG. 2, each track segment 14 may expose an outer vertical wall 20 supporting multiple conductive coils 22 spaced along the axis 18. The conductive coils 22 each produce an independent magnetic field determined by electrical current flow through the coil 22, the magnetic field extending outward perpendicularly from the outer vertical wall 20.

The magnetic field from each coil 22 may interact with permanent magnets 24 adjacent to the outer wall 20 and affixed to an inner vertical face of each mover 16 when the mover 16 is installed on the track 12. The mover 16 may be propelled and positioned by selective energization of the coils 22 in the manner of a synchronous permanent magnet motor.

Hardened guide rails 26 extending along the axis 18 on each track segment 14, for example, at corners of a track segment 14 having a rectangular cross-section, can be received by the v-wheels 27 positioned on the mover 16, the latter providing ball bearings permitting the v-wheels 27 to smoothly guide the mover 16 along the track with interaction between the coils 22 and the magnets 24. In use, the mover 16 provides for outer surfaces 28 to which other machine components or product to be conveyed may be attached.

An inner vertical wall 30 of the track segment 14 may provide a set of magnetic sensors 32 such as Hall effect, magnetostrictive or other similar sensor types interacting with a sensor activator 34 (such as a magnet) carried by the mover 16 allowing the location of the mover 16 along the track 12 to be positively identified. It will be appreciated that other mover geometries can be used including those in which the mover is attached to the inner (concave) side of the track 12 and where the sensors 32 are attached to the outside or top or bottom of the track.

Referring still to FIGS. 1 and 2, each segment 14 of the track 12 may be associated with motor drive units 36 providing independent drive amplifiers 37 for each coil 22 that may be controlled to apply a current independently to each coil 22 in the manner of a drive circuit for a DC permanent magnet motor. Generally each segment 14 may be associated with separate motor drive units 36.

The motor drive units 36 may include a processor 38 executing a program 40 stored in non-transient computer memory 42 so that the motor drive units 36 may receive control data 44 through input circuitry 46 including position commands, velocity commands, and acceleration commands, for positioning a mover 16 on the track 12 by control of the coils 22. The motor drive units 36 may also receive the output the sensors 32 identifying the location of the mover 16 for control purposes and also providing position information through the control data 44 to external devices.

Generally the motor drive units 36 will manage the delivery of controlled current and voltage to the coils 22 and the sequencing of the coils 22 to provide for a predetermined acceleration and/or velocity to realize instructed position/velocity/acceleration as may be received as instructions in the control data 44. In this process, the drive amplifier 37 may sequence the coils 22 changing the current and voltage on each one to provide a smooth and certain acceleration of the movers 16 to control velocity and may track the position of the mover 16 both by using the Hall effect sensors 32 and through knowledge of the energized coils such as define a current position of the mover 16. Each drive amplifier 37 may monitor its current and voltage output and provide this information to the processor 38 for reporting back as load signals on the control data 44 such as may be used to assess the inertial load on the mover 16 as will be discussed below.

Referring still to FIG. 1, each of the motor drive units 36 may exchange control data 44 with one or more I/O modules 50 of an industrial control system 52, the latter in turn communicating with terminals 54 such as programming terminals or human machine interface terminals and/or with a network 56.

Figure 3:
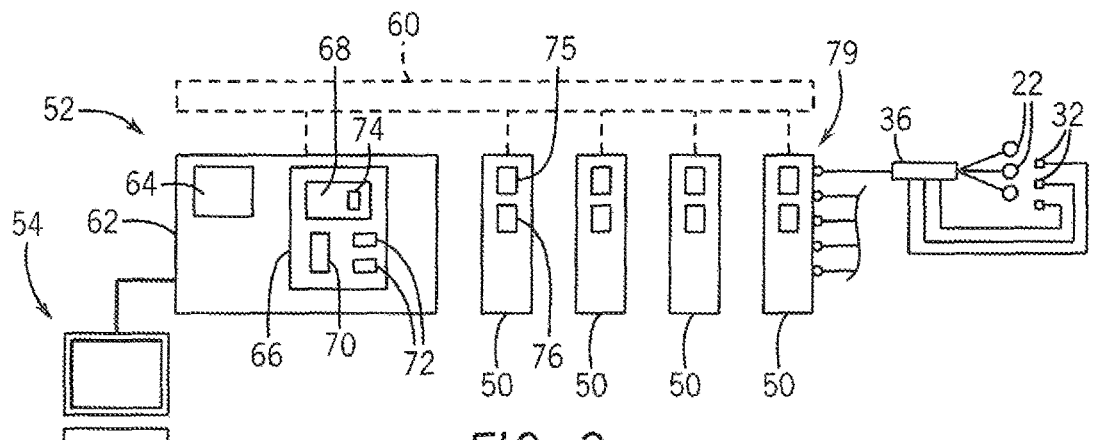
FIG. 3 is a block diagram of the controller and linear motor system of FIG. 1.

Referring now to FIGS. 1 and 3, the industrial control system 52, for example, may be an industrial control or such as is commercially available from Rockwell Automation under the Logix tradename and may provide a backplane 60 allowing electrical interconnection between the I/O modules 50 and a control processor 62.

Normally, each of the I/O modules 50 may connect or disconnect from the backplane 60 through a releasable electrical connector, for example, to allow customization of the control system 52. Each of the I/O modules 50 may provide for one or more releasable terminals such as screw terminals or electrical connectors 79 allowing interconnection of the I/O modules to conductors communicating with the motor drive units 36. In addition, each I/O module 50 may include a processor 75 and electronic memory 76, the latter holding a stored program that can include portions assisting in implementation of the present invention.

The control processor 62, also attached to the backplane 60, may include one or more processor cores 64 communicating with electronic memory 66, the latter holding an operating program 68 as will be discussed below. The operating program 68 may include a coordination subsystem 74 implemented in firmware and/or hardware in the control processor 62 as will be described in detail below.

Electronic memory 66 may also hold various data files 72 including, for example, configuration files that will be used to configure the linear motor system 10 as will be discussed below.

The electronic memory 66 may also hold one or more industrial control programs 70 prepared using a standard industrial control language and describing a desired operation of the multi-mover, linear motor system 10 for a particular application. Industrial control programs 70 will typically be prepared for a particular application, for example, off-line using a standard desktop computer.

Figure 4:
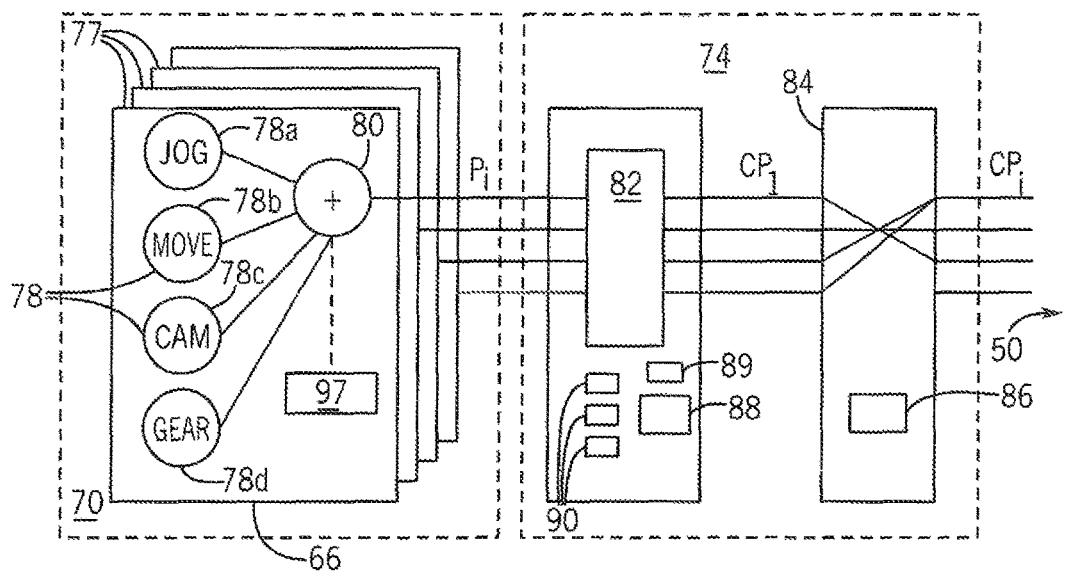
FIG. 4 is a functional block diagram showing a control program executed by the controller of FIG. 3 and employing conventional motor control commands as may interact with a coordination subsystem of the present invention also implemented by the controller.

Referring now to FIGS. 3 and 4, each control program 70 may be constructed of instructions including movement instructions 77 and generating command movement signals $P_i$ referenced to movement axis 18 and describing desired movement of the movers 16 largely without consideration of the interaction between movers 16.

Generally, the motion instructions 77 may be represented as a set of nodes 78 each providing a different expression of motion control. The node 78 may include, for example, a jog node 78a that when activated in the control program 70 provides for a brief movement motion of the mover 16 of predetermined velocity and duration, for example, allowing it to be manually manipulated for positioning or the like. The motion instructions 77 may alternatively or in addition provide command node 78b providing a point-to-point movement of the mover 16 from an arbitrary given location on axis 18 to a second location on axis 18. In addition or alternatively, the motion instructions 77 may provide a cam node 78c provides a simple cyclic motion of the mover 16, for example, as if driven by a mechanical cam, according to a predefined cam profile. Likewise a gear node 78d may be provided implementing linkage of movement of a mover 16 to another movement signal as if a gear or shaft connected those two movements.

The outputs from each of these nodes 78 may be summed together by axis adder 80 to provide the command movement signal $P_i$ consisting of a set of values (indexed by i) describing the desired motion of a given mover 16 over time. A different position output $P_i$ will generally be provided by different instructions 77 for each mover 16.

These command position signals $P_i$ will then be received by coordination subsystem 74 separate from the control programs 70, for example, being part of the firmware of the industrial control system 52 and shared by all control programs 70, for example, as instanced objects. The coordination subsystem 74 converts the command movement signals $P_i$ to coordinated position signals $CP_i$ that respect interaction between the movers 16 as will be discussed. This conversion process can be thought of as a coordinate transformation and may be implemented using resources of existing coordinate transfer hardware and software. The coordination subsystem 74 need not be prepared by the programmers of the control program 70 and simplifies the programming of the mover 16 in the control program 70 by moving tasks such as collision avoidance and cluster movement into a unitized framework outside of the control program 70 without duplication in the control program 70.

The resulting cooperative position values $CP_i$ are then provided to a segment router 84 which forwards these position values to a selected I/O module 50 (associated with the positions described by the position values) and ultimately to a motor drive unit 36 controlling the coils 22 (shown in FIG. 2) relevant to the location of the given mover 16.

Figures 5, 6:
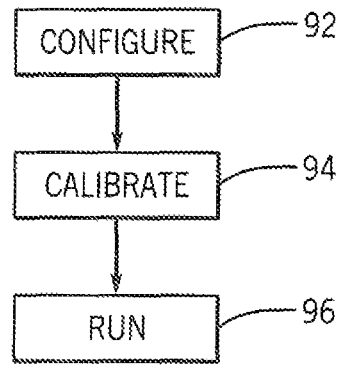
FIG. 5 is a block diagram of the steps of integrating control programs and the coordination subsystem of the present invention with a linear motor system.
FIG. 6 is a data structure used by the coordination subsystem of FIG. 4.

Referring now to FIGS. 1, 4 and 5, the coordination subsystem 74 and the segment router 84 may make use of configuration files populated at a single time at commissioning of the multi-mover, linear motor system 10 as indicated by process block 92. During this configuration process, configuration files including an environmental configuration file 88, a cluster configuration file 89, and mover configuration file 90 used by the coordination subsystem 74 and a mapper configuration file 86 used by the segment router 84 can be populated. A first step in this configuration process 92 establishes the range of position values $P_i$ (or identical range $CP_i$) sufficient to describe the full length of the track axis 18 as entered together with an absolute zero reference point. This allows locations on the track 12 to be uniquely identified for the given track topology which can change depending on the number and type of segments 14 in the track 12. Generally this range will be a set of integers ranging from zero to N where N is determined by the length of the track 12 and defines a rollover or unwind value as a mover 16 moves around the track. The environmental configuration file 88 will also describe any branching in the track (to be discussed below) and the number of movers and their order on the track so that a leader mover can be identified as described below.

During the configuration of process block 92, the configuration file 86 for the segment router 84 is also populated identifying subsets of this position value range to each track segment 14 and thus to each motor drive unit 36. Configuration file 86 may link each segment to an I/O module 50 controlling the appropriate motor drive unit 36. In this way, the segment router 84 can simply establish to which I/O module 50 to output the values of $CP_i$ by identifying a range in which the value of $CP_i$ falls using configuration file 86 and routing accordingly.

The configuration files also include a mover configuration file 90 holding information describing each mover 16 that will be necessary for the coordination subsystem 74 to provide the necessary coordination between movers 16.

Referring now to FIG. 6 the mover configuration file 90 may be represented logically in the form of a table having a row for each mover 16. The first column of the table may provide a mover identification number being, for example, linkable to a mover identification or tag used by the control programs 70 to identify a given mover 16. Here, simplified identifiers of one through five are shown for clarity in a five-mover, multi-mover system. A second column of the table provides the identity of a "leader" mover 16 for each mover 16. The leader mover 16' will be the mover 16 immediately adjacent to the given mover 16 of that row in the current direction of motion. This leader mover 16' can change as will be discussed below both when the direction of the mover changes and in cases where the track 12 includes branches. Each mover 16 will instantaneously have only a single leader mover 16'.

A third column of the table may provide for a current command position $P_i$ of the mover 16 of that row, for example, as updated periodically from inputs to the coordination subsystem 74. Likewise, the current coordinated position $CP_i$ may be conveniently held in this record as indicated by a fourth column for reference as will be discussed below with respect to FIG. 7.

A fifth column of each row can provide for a desired separation 126 between the given mover 16 and its leader mover 16' such as may be adjusted by the control programs 70 under user control. The sixth column may hold a minimum collision avoidance distance 103 between the mover 16 and the leader mover 16' such as will be determined by the coordination subsystem 74 based on a calibration process to be described. This minimum collision avoidance distance 103 is a minimum distance under the dynamics of the system necessary to ensure collision-free operation between the movers, for example, if a leader mover 16' were to stop unexpectedly at a maximum conceivable deceleration (e.g., instantaneously). The minimum collision avoidance distance 103 may be used to develop indications to the user when the system overrides user entered values or to generate alarms.

The seventh column may provide for an inertia ratio of the mover 16 of that row basically indicating the weight carried by the mover 16 beyond its normal weight. Typically a mover 16 without further material attached to it will have an inertia ratio of 1:1 and this value will rise (for example, to 2:1) as the weight attached to the mover 16 increases. Inertia ratio controls how fast mover 16 can accelerate and decelerate under the rated force provided by the coils 22 of the multi-mover, linear motor system 10 and may be determined empirically for an automatic process of calibration that will be described below. The eighth column indicates whether the mover is moving in a cluster move mode, according to a special instruction available to programmers programming control program 70 as implemented by the coordination subsystem 74. The ninth column describes a maximum acceleration and deceleration permitted during cluster moves such as is defined by the maximum attainable speed by the heaviest mover 16 of a cluster when the movers 16 are not identically loaded. The mover configuration file 90 may generally provide for dynamic parameters that define the speed, acceleration, deceleration and jerk of the mover 16 in real time.

Referring again to FIG. 5, after configuration per process block 92, at process block 94 a calibration can be performed to determine the inertia ratio described above when it is not manually entered. In one example, the inertia ratio may be determined, for example, by test accelerations of the movers 16 while monitoring both the position and the current output of the drive amplifiers 37 such as indicates the energy applied to the mover. Inertia ratio is determined generally by Newton's formula equating mass acceleration and force. As a practical matter, the inertia ratio will be used to determine a maximum acceleration or deceleration of the mover 16 such as may be also stored or computed as needed as is used for computing separations between movers 16 and to coordinate movement during cluster moves as will be discussed below. This maximum acceleration and deceleration may be used to define or update the minimum collision avoidance distance 103 discussed above typically by taking the distance required for full deceleration to zero velocity from maximum velocity and adding a margin, for example, 25 percent.

At process block 96, once configuration and calibration are complete, the movers 16 may be operated under the control of the control program 70 as will now be described.

Figure 7:
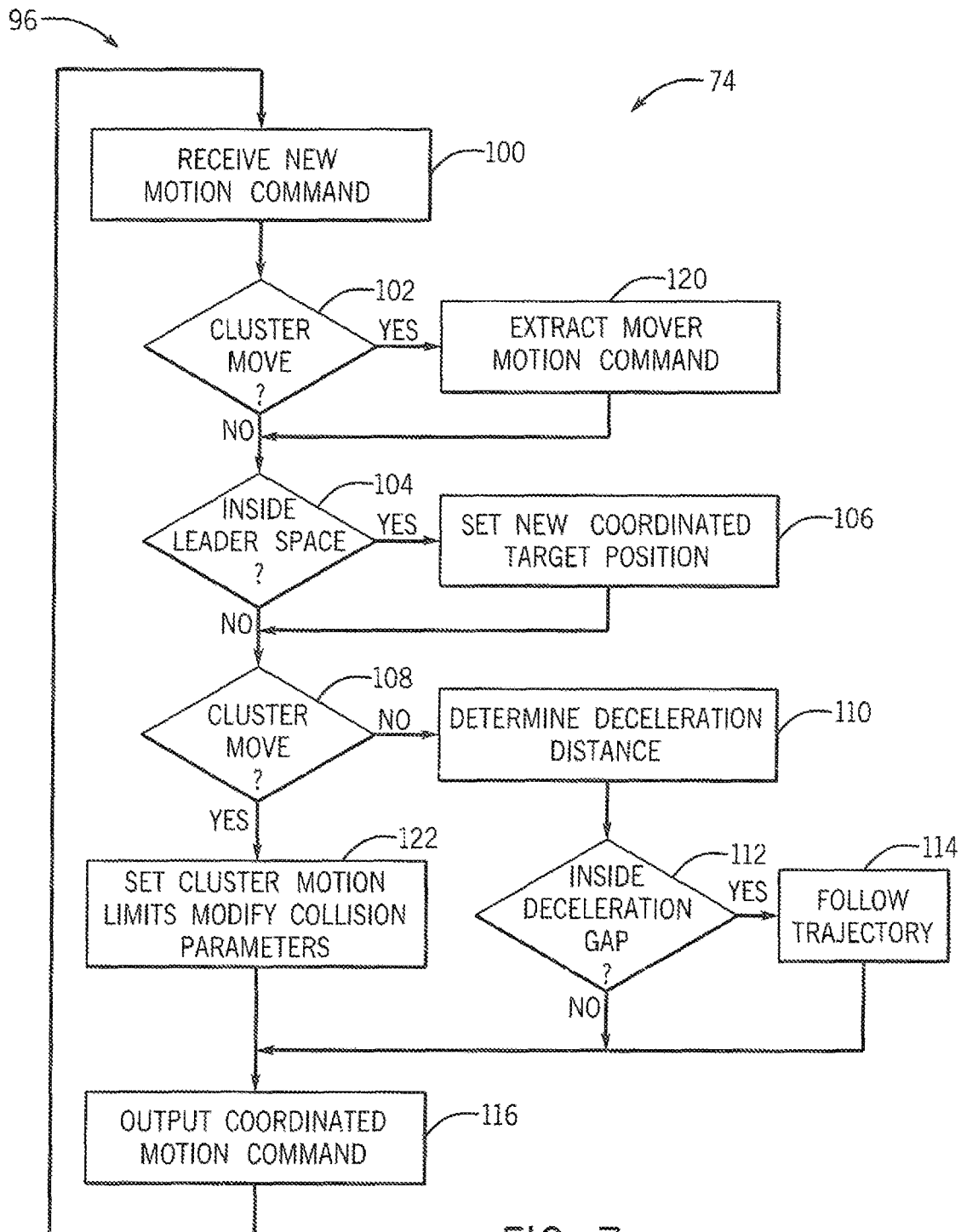
FIG. 7 is a flowchart of the operation of the controller of FIG. 1 implemented in either a centralized or distributed fashion.
Figure 8:
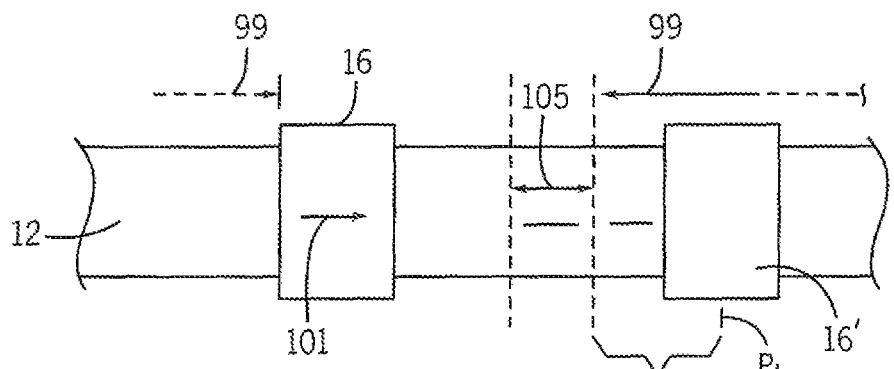
FIG. 8 is a top plan view of a section of track showing two movers and dimensions referred to with respect to FIG. 7.
Figure 9:
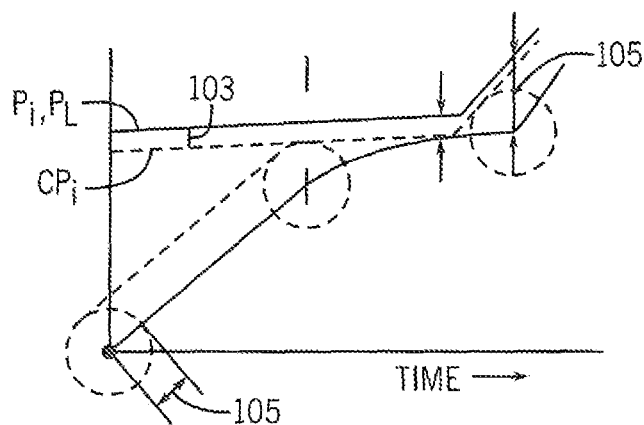
FIG. 9 is a plot of mover position versus time for two movers showing a trajectory enforced on one mover by the present invention.

Referring now to FIGS. 4, 7, 8 and 9 during the run time of process block 96, one or more individual control programs 70 prepared by a programmer may be executed by the control system 52 to provide a set of command movement signals $P_i$ values according to well-known motion instruction 77 or other common industrial control language models, as discussed above with respect to FIG. 4. These command movement signals $P_i$ are received as indicated by process block 100 by the runtime coordination subsystem 74 and are normally accompanied by command meta-information 97 such as indicating a point-to-point move, a cluster move, or a cluster move parameter adjustment. At decision block 102 it is determined whether meta-information associated with command movement signals $P_i$ is a "cluster move command". This cluster move command will be described later.

Assuming the command is not a cluster move command, the runtime coordination subsystem 74 proceeds to decision block 104 and a determination is made as to whether the destination of the move command lies inside a "leader space" 99 of the leader mover 16'. As shown in FIG. 8, the leader space 99 is defined as the location of the given leader mover 16' (typically a center point $P_L$) for the given leader mover 16' offset (in a direction opposite the motion 101 of the given mover 16) by half the width of the leader mover 16' (thus defining the rear edge of the leader mover 16') and further offset by the minimum collision avoidance distance 103 defined in mover configuration file 90 for the given mover 16. Any distance within this leader space 99 forward in the direction of motion 101 up to the location of the rear edge of the given mover 16 is considered within the leader space 99 as representing a risk of collision with the leader mover 16 if this position $P_i$ were to be obtained.

If the new position $P_i$ from the command received at process block 100 is within the leader space 99 per decision block 104, the coordination subsystem 74 proceeds to process block 106 and a new coordinated position $CP_i$ is calculated to replace position $P_i$. This new coordinated position $CP_i$ is set equal to the beginning of the leader space 99 as defined above. That is, the given mover 16 is now targeted to move to a position just shy of the beginning of the minimum collision avoidance distance 103. If the new position from the command received at process block 100 is not within the leader space 99 per decision block 104, the new coordinated position $CP_i$ is set equal to $P_i$, that is, it is unmodified.

In either case, at succeeding decision block 108, the coordination subsystem 74 again determines whether movement of the given mover 16 is part of a cluster move instruction. If not, the program proceeds to process block 122 and the deceleration distance 105 for the given mover 16 is calculated. Generally the deceleration distance 105 (shown in FIG. 8) represents a distance at which the given mover 16 would need to begin deceleration to provide a controlled deceleration to stop at the coordination position $CP_i$ (for example, at the minimum collision avoidance distance 103 behind the leader mover 16').

The deceleration distance 105 is generally a function of the inertia ratio of the given mover 16 stored in the mover configuration file 90. Generally the larger the inertia ratio, the larger the deceleration distance 105. The deceleration distance 105 may also be a dynamic value that changes both with the speed of the given mover 16 and the speed of the leader mover 16'. Here the faster the given mover 16 is moving, the longer the deceleration distance 105 and the faster the leader mover 16' is moving the shorter the deceleration distance 105.

At succeeding decision block 112, it is determined whether the current position of the mover 16 returned from motor drive unit 36 associated with a segment 14 of the track 12 is within the deceleration distance 105 of the minimum collision distance behind the leader mover 16', that is, whether the given mover 16 must begin deceleration to prevent overshoot of the minimum collision distance behind the leader mover 16'. This position may be determined either directly by measurement of Hall effect sensors 32 or is deduced from the recent history of coils 22 being energized during the acceleration or movement of the mover 16.

If the mover 16 is within the deceleration distance 105 from the leader mover 16', then at process block 114, a control deceleration 111 of the mover 16 is initiated. This deceleration may, for example, provide commands to the motor drive unit 36 to reduce velocity while still preserving the coordinated position $CP_i$. The deceleration may follow a sophisticated deceleration trajectory reflecting known dynamics of the mover 16 and the capabilities of the motor drive units 36. These dynamics may for example include known information about the load, position, velocity, and acceleration of the mover 16 and the leader mover 16'.

While the operation of the runtime subsystem 74 has been depicted as a sequential flowchart, it will be appreciated that various control algorithms may operate continuously in parallel to ensure smooth real-time control.

In either case after decision block 112, the coordination subsystem 74 proceeds to output block 116 and the new coordinated $CP_i$ and any velocity commands are output through the I/O modules to the respective motor drive units 36 to be routed by the segment router 84.

It will be appreciated that without involvement of the industrial control program programmer, collision between mover 16 and movers 16 moving to a common location will neatly queue at the minimum collision avoidance distance 103 ensuring no collision and will dequeue as the leader mover 16' advances to in turn move to that common location.

Referring now to FIG. 9, the operation of the runtime coordination subsystem 74 in preventing collisions can produce a "caterpillar" effect when the leader mover 16' starts where each follower mover 16 drops behind the leader mover 16' from the minimum collision avoidance distance 103 until the deceleration distance 105 has been exceeded. The reverse situation when the leader mover 16' stops will also occur with the follower mover 16 bunching to the minimum collision avoidance distance 103.

This separation and bunching be accommodated in some embodiments by adjusting the deceleration distance 105 to better reflect current motion of the leader mover 16' but this can nevertheless result in undesired variation in separation distance between movers 16 at least dynamically. Any separation and bunching can prevent the multi-mover, linear motor system 10 from being used in applications where constant mover separation is desired, for example, when different movers 16 hold different components that must be positioned in a fixed relationship as they move.

Accordingly the present invention contemplates a cluster move command detected at process blocks 102 and 108 of FIG. 7. The cluster move command allows a set of movers 16 in a predefined cluster to move in perfect synchrony maintaining their constant separation distances. Generally the cluster command will provide a cluster position signal $CLP_i$ indexed with respect to a single point (for example, the center of mass of the cluster or any other predetermined position with respect to the center of mass of the cluster).

Referring now to FIGS. 5, 7 and 9, during the run time of process block 96, the cluster configuration file 89 may be configured dynamically by an application program to describe a cluster with respect to the identities of each mover 16 in the cluster and a desired cluster reference point (for example, the center of mass of the cluster) and the like. Referring to FIG. 7, at block 102, if a cluster move command is received in the meta-information 97 with the cluster command movement signals $CLP_i$ at process block 100, then at decision block 102, the program branches to process block 120. The runtime coordination subsystem 74 will then consult a cluster configuration file 89 of the command indicating the movers 16 included and the relative location of the cluster position signal $CLP_i$ to break up the cluster move command into individual move commands each with a stream of command movement signals $P_i$ for each of the movers 16 at process block 120. This division simply requires subtraction (or addition) of an offset value to the command movement signals $CLP_i$. These command movement signals $P_i$ are then processed as normal command movement signals $P_i$ as described above for each mover 16 in the cluster.

At decision block 108, if a cluster move is being conducted, a maximum velocity for all movers 16 of the cluster is determined based on the highest inertia ratio of any mover 16 in the cluster. This ensures that each mover 16 in the cluster accelerates and decelerates only as fast as the slowest mover 16 (typically the mover 16 having the greatest weight attached to it). At process block 110 the deceleration distance 105 may be set to zero recognizing that the leader mover 16' will have identical motion as that of the mover 16 thus ensuring that both can decelerate at the same speed without risk of collision. That is, the leader mover 16' will not stop any faster than the follower mover 16.

Figure 10:
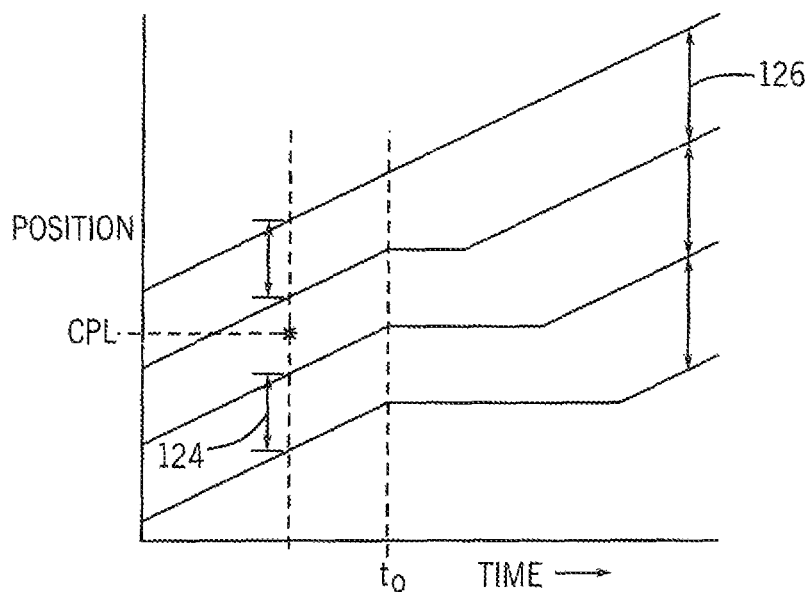
FIG. 10 is a figure similar to that of FIG. 9 showing multiple movers moving in a cluster move operation.

Referring now to FIG. 10, the cluster move command may include a separation command value which may adjust an initial separation distance 124 between the movers 16 of the cluster and which may change that separation distance 124 dynamically at any time by modifying minimum collision avoidance distance 103 to be any value greater than its default minimum value. So, for example, at a time $t_0$, a cluster move separation command may be received to increase the separation between the movers 16 to a new desired greater separation 126. This command results in leader mover 16' continuing at its current velocity and the succeeding movers 16 each modifying their velocity to arrive at the desired separations at a predetermined time interval. In a simple case, the movers 16 following the leader mover 16' may stop or slow to a predetermined velocity for different periods of time to allow the necessary distances to be attained. This prevents any mover from having to exceed the maximum velocity allowed of the mover 16 while allowing normal operation at close to that maximum velocity. In the reverse case, the leader mover 16' may stop (or slow to a predetermined velocity) and each successive mover 16 then follows suit until the desired spacing has been obtained with the last mover 16 and then the cluster again proceeds forward at identical velocity. The cluster move command is set up so that each of the mover 16 simultaneously receives commands to begin and end motion at the same time with appropriate velocity, acceleration etc.

Figure 11:
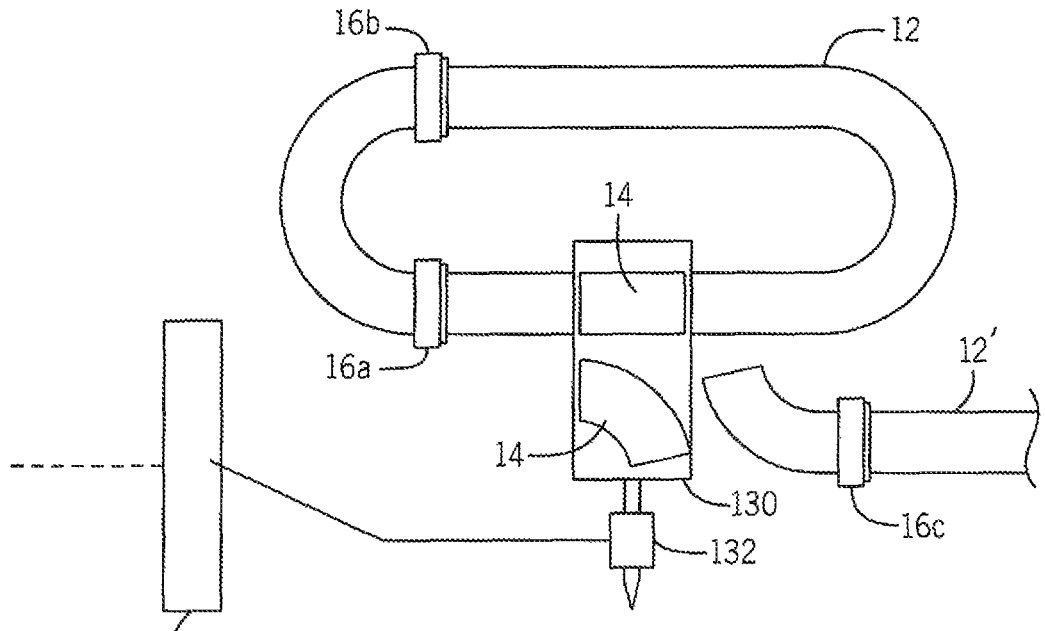
FIG. 11 is a simplified view of a track similar to that shown in FIG. 1 but having branching capabilities for allowing movers to move between different track branches.

Referring now to FIG. 11, the invention contemplates that the track 12 may include one or more branch tracks 12' allowing movers 16 to move from track 12 to track 12' by activation of a switch segment 130, for example, described at U.S. Pat. No. 7,026,732 hereby incorporated by reference. The switch segment 130 maybe activated, for example, by an actuator 132 controlled by one I/O module 50 under control of a branch command implemented by the control program 70. Before the switching of the branch segment 130, mover 16a may identify mover 16b as its leader mover 16' in mover configuration file 90. Invocation of the branch instruction, however, causes the runtime coordination subsystem 74, making use of the configuration file 88, to change the leader relationship for mover 16a to 16c known by the runtime coordination subsystem 74 to be on the branch track 12'. A similar changing of leader mover 16' may be invoked by the runtime coordination subsystem 74 when a given mover 16 reverses direction. The runtime coordination subsystem 74 may model the multi-driver system 10 for animation purposes and also to be able to identify a leader mover 16' in complex system topologies. A similar change in leader mover 16' will be implemented when the direction of the mover 16 changes for any reason.

Figure 12:
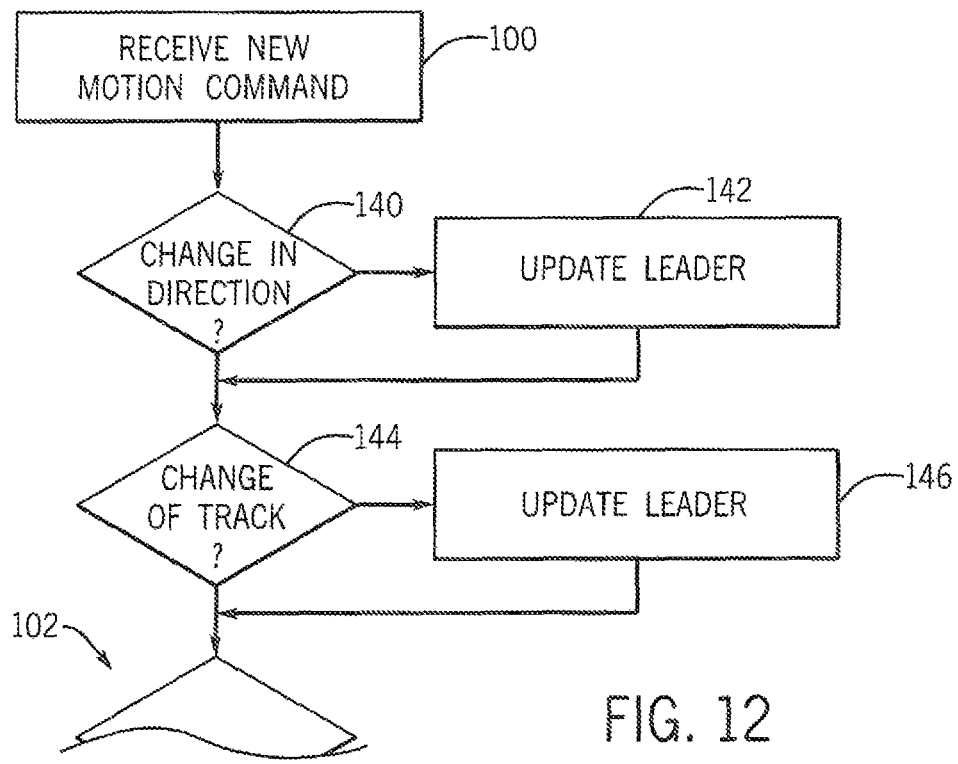
FIG. 12 is a fragment of the flowchart of FIG. 7 showing additional instructions for managing bidirectional or bifurcated track structures.

Referring to FIG. 12, for this purpose, process block 100 of FIG. 7 may be followed by a decision block 140 detecting a change in direction of a mover 16, for example, being part of command movement signals $P_i$ received at decision block 102. At process block 142, in response to this change in direction, the runtime coordination subsystem 74 may update the leader for each mover 16 in mover configuration file 90. Similarly at decision block 144 a change in track configuration, for example, caused by the switching of the segment 130 of FIG. 11 may cause an updating of leader in mover configuration file 90 per process block 146.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A control system for a multi-mover, linear motor system providing multiple movers movable along a path on a track, each mover providing magnetic pole elements interacting with electrical coils distributed along the track for movement of the mover along the track as the electrical coils are activated in response to track signals, the control system comprising:
   I/O circuits adapted to communicate with the track to provide track signals to the track;
   a controller circuit communicating with the I/O circuits and operating to:
   (a) receive and execute an industrial control program generating command movement signals for at least two movers on a track describing a desired position of each mover on the track;
   (b) execute a coordination subsystem separate from the received industrial control program and convert the desired position of at least one mover on the track to coordinated movement signals which change the command movement signals according to current relative positions of at least one other mover; and
   (c) communicate the coordinated movement signals to the I/O circuits for outputting as track control signals.

2. The control system of claim 1 wherein the coordination subsystem includes a data structure for each given mover indicating a leader for that given mover being an adjacent mover in a direction of movement of the given mover and wherein the coordinated movement signal for each given mover is a function of movement of a leader for that given mover.

3. The control system of claim 2 wherein the coordination subsystem data structure further includes minimum collision avoidance distance for each given mover and wherein the coordination subsystem modifies a command movement signal falling within an offset equal to the minimum collision avoidance distance from a position of the leader by changing the command movement signal to a coordinated movement signal equal to the position of the leader offset by the minimum collision avoidance distance.

4. The control system of claim 3 wherein the coordination subsystem data structure further includes an inertia value for each given mover and wherein the coordination subsystem modifies the command movement signal falling within a protection zone offset from the minimum collision avoidance distance of the leader of the given mover to follow a trajectory allowing the mover to maintain a separation no less than the minimum collision avoidance distance, where a size of the protection zone is a function of the inertia value of the given mover.

5. The control system of claim 4 wherein the size of the protection zone is also a function of inertia value of the leader.

6. The control system of claim 1 wherein the coordination subsystem changes a leader for a given mover when a direction of the mover changes.

7. The control system of claim 6 wherein the track further provides a branch segment operating to allow movers to move between a first and second track at a branch, and the I/O circuits are further adapted to communicate with a branch actuator actuating the branch to allow a given mover to move between the first and second track and wherein the industrial control program includes a branch control instruction activating the branch and wherein the coordination subsystem executes to change a leader for the given mover as it moves from the first to the second track.

8. The control system of claim 1 wherein the industrial control program includes a cluster movement command describing a unison movement of multiple movers and wherein the coordination subsystem divides the cluster command into separate command movement signals for each mover of the multiple movers separated by a predetermined minimum collision avoidance distance.

9. The control system of claim 8 wherein the coordination subsystem modifies a protection zone for follower objects within the cluster, the protection zone describing a distance at which the mover must decelerate to stop at the minimum collision avoidance distance, by reducing the protection zone.

10. The control system of claim 8 wherein the coordination subsystem converts the command movement signals to coordinate movement signals by limiting a maximum velocity and acceleration of the multiple movers to the lowest maximum acceleration and velocity of any of the movers of the multiple movers.

11. The control system of claim 8 wherein the industrial control program includes a separation command describing a desired separation between the movers of the multiple movers, and the coordination subsystem converts the command movement signals to coordinate movement signals by increasing the predetermined minimum collision avoidance distances by the difference between the desired separation and the minimum collision avoidance distance.

12. The control system of claim 1 wherein the electrical coils of the track are arranged in segments associated with motor drive circuitry and wherein the coordination subsystem receives information associating different segments with different I/O circuits and wherein the coordination subsystem directs the coordinated movement signals to an I/O circuit based on a mapping of the coordinated movement to a segment having coils proximate to a track location of the coordinated movement signals.

13. The control system of claim 1 wherein the given drive circuitry receives position signals limited to positions associated with coils connected to the given drive circuitry.

14. The control system of claim 1 wherein the controller circuit includes at least one processor executing a first stored program to execute the industrial control program and a second stored program to execute the coordination subsystem.

15. A control system for a multi-mover, linear motor system providing multiple movers movable along a path on a track, each mover providing magnetic pole elements interacting with electrical coils distributed along the track for movement of the mover along the track as the electrical coils are activated in response to track signals, the control system comprising:
I/O circuits adapted to communicate with the track to provide track signals to the track; and
a controller circuit including a control program execution means and a coordination subsystem means and communicating with the I/O circuits and operating to:
(a) execute an industrial control program using the control program execution means to generate command movement signals for at least two movers on a track describing a desired position of each mover on the track;
(b) convert the command movement signals for at least one mover to coordinate movement signals, using the coordination subsystem means, the conversion changing the command movement signals according to current relative positions of at least one other mover, and
(c) communicate the coordinated movement signals to the I/O circuits for outputting as track control signals.

16. A method of controlling a multi-mover, linear motor system providing multiple movers movable along a path on a track, each mover providing magnetic pole elements interacting with electrical coils distributed along the track for movement of the mover along the track as the electrical coils are activated in response to track signals, the method including:
(a) preparing an industrial control program generating command movement signals for at least two movers on the track, the command movement signals describing a desired position of each movement on the track independent of collision between the movers;
(b) installing the industrial control program on a control system including I/O circuits adapted to communicate with the track to provide track signals to the track;
(c) execute the industrial control program contemporaneously with operation of a coordination subsystem on the control system and separate from the received industrial control programs to convert the desired position of at least one mover on the track to coordinated movement signals which change the command movement signals according to current relative positions of at least one other mover; and
(c) communicate the coordinated movement signals to the I/O circuits.

* * * * *